(No Model.)
F. P. MILLER.
VEHICLE TIRE CLAMP.
No. 557,138. Patented Mar. 31, 1896.
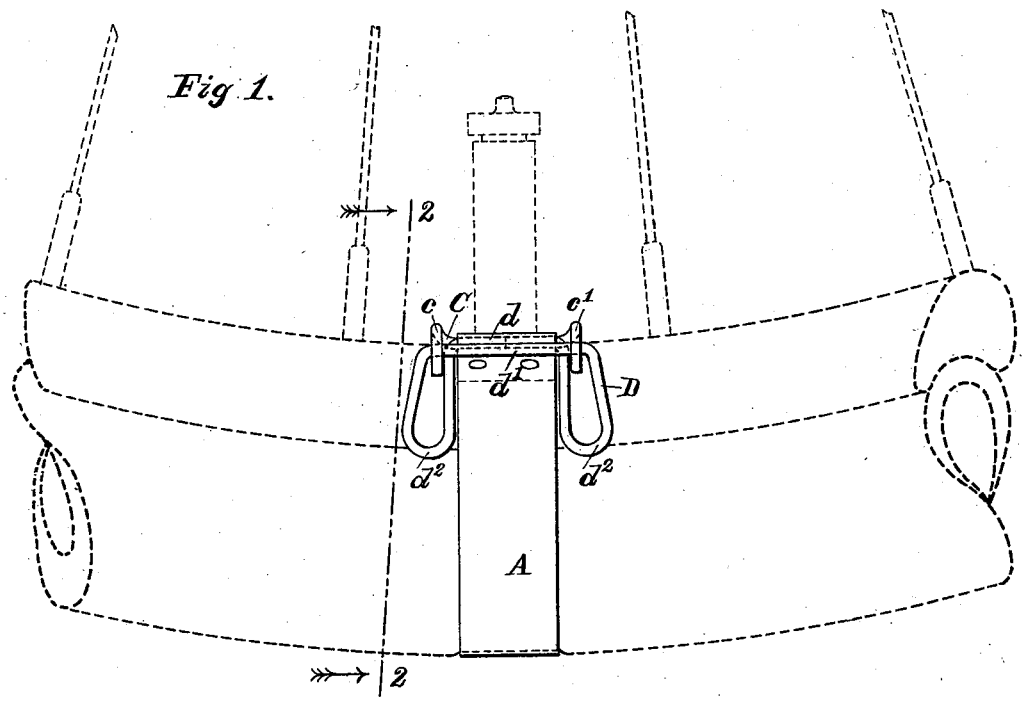
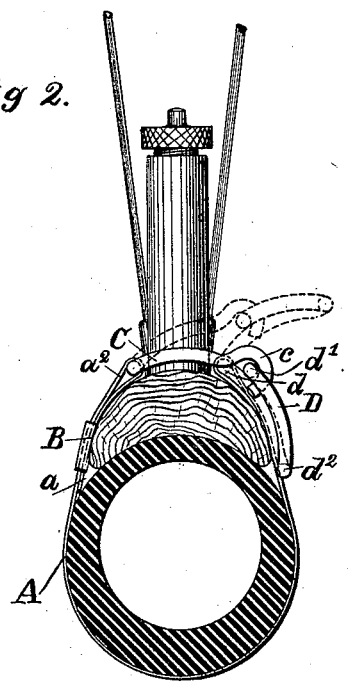
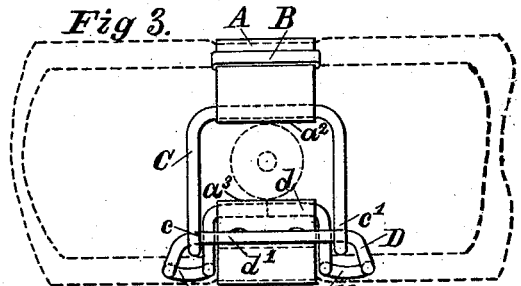
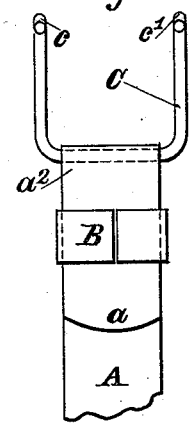
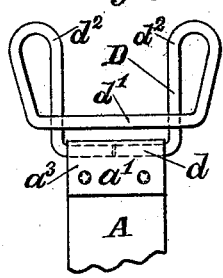
WITNESSES.
J. M. Schwerin
M. Schwerin
INVENTOR.
Frank P. Miller.

UNITED STATES PATENT OFFICE.

FRANK P. MILLER, OF JERSEY CITY, NEW JERSEY, ASSIGNOR, BY MESNE ASSIGNMENTS, OF ONE-HALF TO JEROME M. SCHWERIN, OF NEWARK, NEW JERSEY.

VEHICLE-TIRE CLAMP.

SPECIFICATION forming part of Letters Patent No. 557,138, dated March 31, 1896.

Application filed September 19, 1895. Serial No. 562,942. (No model.)

*To all whom it may concern:*

Be it known that I, FRANK P. MILLER, a citizen of the United States, and a resident of Jersey City, in the county of Hudson and State of New Jersey, have invented certain new and useful Improvements in Vehicle-Tire Clamps, of which the following is a specification.

My invention relates to that class of devices which are adapted to clasp or engage the opposite ends of a band or tie surrounding an object constituted of a number of articles in such manner as to maintain the same in entirety or in a particular arrangement and at the same time capable of being easily released or disengaged.

My invention is useful in many such devices as bicycle-tire clamps, bale-ties, hose-coupling clamps, and a variety of other similar and obvious applications. I have seen fit in the drawings to show it as applied to a clamp used for holding in place a stripped bicycle-tire.

In describing my invention I shall refer to the accompanying drawings, in which—

Figure 1 is a side view of a portion of a bicycle tire and felly, showing my clamping device. Fig. 2 is a sectional end view through line 2 2, Fig. 1. Fig. 3 is a plan view of the clamp represented in the position shown in Fig. 1. Figs. 4 and 5 are detail views of the two members of my clasping or locking device.

In the different figures like parts are represented by the same letters.

I am aware that there are now in use many devices similar to mine, or, at least, designed to accomplish the same result in securing the opposite ends of bands or ties in such manner as to allow the same to be released; but they are either very expensive, or they are not easily adjusted, or they can be released only by destroying the band or tie. In cases where one or another of these defects is not present the device has no "take-up."

What I have sought to accomplish is to provide a device, in combination with a band or tie, that is at once cheap, durable, simple, and easy in locking and releasing, and which, in the process of locking, takes up or abridges the space existing between the ends, when adjusted in place, preparatory to locking, thereby not only binding with a greater or lesser degree of tightness, but by the very strain exerted by the ends in drawing apart retains the catch in a locked state.

To the end that my device may be easily and fully understood, I will now proceed to describe the same in detail, and then in the appended claims point out the items of invention which I desire to secure.

My device, in the simple form shown in the drawings, consists of two members C and D. The member C, which is attached to the free or adjustable end of a strap or band of flexible material, (in this case thin spring-brass,) is U-shaped, having the ends turned forward, in the shape of hooks $c$ and $c'$, at right angle to the line of the base, the member C being attached to the flexible band A by turning the end $a$ of the band over the base or bar, as at $a^2$, and securing in place by sliding over it the loop B, which is so formed as to encompass the band A and the lapped end $a$ with sufficient closeness to be held in place frictionally. By this contrivance the band is, obviously, easily adjustable as to length.

The member D is also U-shaped; but instead of the ends being cut off and formed into hooks, as $c$ and $c'$, the ends are carried around substantially in the line of the base to form the loops $d^2 d^2$, and then being brought back in a line of a plane parallel to the base from the catch-bar $d'$. This member is held in the eye of the band A by turning the end $a'$ over, as at $a^3$, and securely fastening the same by rivets or otherwise.

The application of the device is as follows: The length of the band being so adjusted (by the end $a$) as to loosely clasp the article to be secured when the members are extended in their greatest length, the hooks $c$ and $c'$ are engaged with the catch-bar $d'$. Then the member D being used as a lever, with its fulcrum on the line of the base $d$, it is forced back on the band A, and the two ends of the band are forced to approach one another, thus tightening the clasp of the band on the articles to be secured together, and as the member is forced back the bar $d'$ is depressed and the bar $d$ is elevated until the axis of the bar $d'$ has passed below that of $d$, when the clasp or tie is locked and can only be released by causing the bar $d'$ to be elevated above $d$.

Although I have seen fit to show my invention as embodied in the materials and forms most desirable to its illustrated application, I do not desire to be understood as restricting myself except as to the most desirable forms and substances in each case.

Having now fully described my invention and its application, what I claim as new, and desire to secure by Letters Patent, is—

1. In a vehicle-tire clamp a band of flexible material adjustable to length and serving as a tie, secured to a hook and catch providing an opening between loops $d^2$ $d^2$ and hooks $c$ and $c'$ and a stop $d'$, substantially as and for the purpose described.

2. In a vehicle-tire clamp a flexible band provided with a hook on one end and a catch on the other said hook being U-shaped the uprights of U extending in direction of length of band and provided with hooks at their ends said catch provided with loops to receive the said hooks and forming a lever substantially as and for the purpose set forth.

3. In a vehicle-tire clamp, a band of flexible material adjustably attached at one end to a U-shaped hook and at the other end fixedly attached to a U-shaped lever-catch, both hook and lever-catch working pivotally in their attachments, and the hooks adapted to engage the bar of the lever-catch, sowise that the catch-bar can be depressed, below the fulcrum-bar, substantially as and for the purposes set forth.

Signed at Newark, in the county of Essex and State of New Jersey, this 17th day of September, A. D. 1895.

FRANK P. MILLER.

Witnesses:
JEROME D. GEDNEY,
W. A. MITCHELL.